No. 813,763. PATENTED FEB. 27, 1906.
A. O. ATKINSON.
SIFTER.
APPLICATION FILED JAN. 23, 1905.
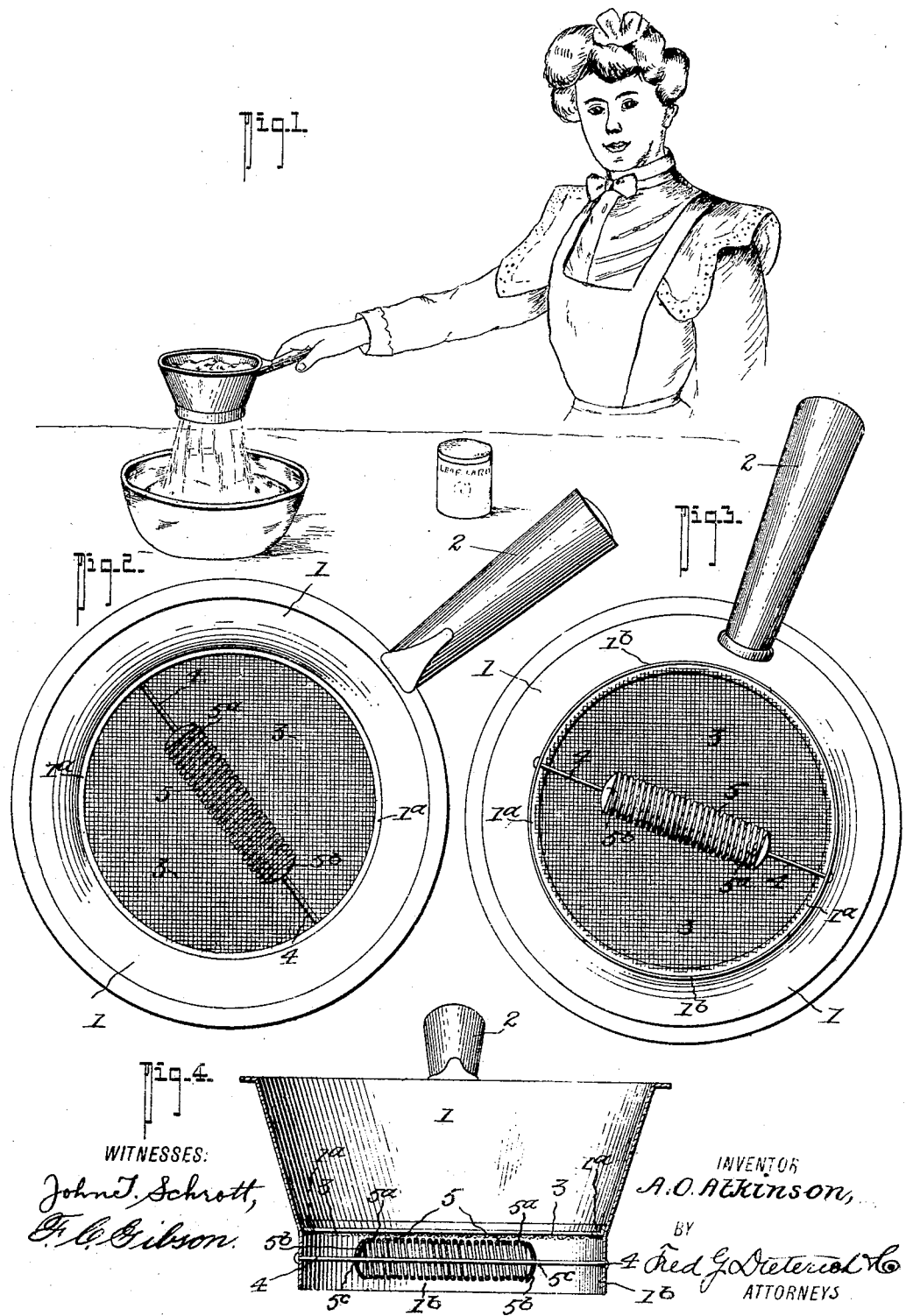
WITNESSES:
John T. Schrott,
F. C. Gibson.
INVENTOR
A. O. Atkinson,
BY
Fred G. Dieterich & Co.
ATTORNEYS

UNITED STATES PATENT OFFICE.

ADRIENNA OTIE ATKINSON, OF LOUISVILLE, KENTUCKY, ASSIGNOR OF ONE-HALF TO GRACE JURT, OF ALEXANDRIA, INDIANA.

SIFTER.

No. 813,763.  Specification of Letters Patent.  Patented Feb. 27, 1906.

Application filed January 23, 1905. Serial No. 242,378.

*To all whom it may concern:*

Be it known that I, ADRIENNA OTIE ATKINSON, residing at Louisville, in the county of Jefferson and State of Kentucky, have invented a new and Improved Sifter, of which the following is a specification.

My invention relates to certain new and useful improvements in sifters, and more particularly seeks to provide a sifter for household use for sifting flour and meal, &c., which is of a simple construction, which can be easily and cheaply manufactured, and which will readily serve its intended purposes.

Generically, my invention comprises a receptacle having a handle and provided with a screen-bottom forming the sieve proper. Below the screen-bottom the receptacle is extended to form a rim and is provided with a transverse rod beneath the screen-bottom upon which is slidably mounted a resilient agitator or vibrator for impacting the sides of the rim to jar the receptacle, and thereby shake the contents of the receptacle through the screen.

Again, my invention seeks to provide an agitator for sieves of this character which is constructed of springy material to aid in moving the same from side to side as it impacts the rim of the receptacle.

With other objects in view than have heretofore been enumerated the invention also comprises certain novel construction and combination of parts, all of which will be first described in detail and then specifically pointed out in the appended claim, reference being had to the accompanying drawings, in which—

Figure 1 is a perspective view showing my invention as applied for use. Fig. 2 is a top plan view thereof. Fig. 3 is an inverted plan view thereof. Fig. 4 is a cross-section of the line 4 4 of Fig. 2.

Referring now to the accompanying drawings, in which like numerals of reference indicate like parts in all of the figures, 1 designates the receptacle, to which a handle 2 is fixedly attached in any approved manner. The receptacle 1 is provided with a bottom of screen wire 3, which may be secured to the receptacle in any approved manner, such as soldering the same to a flange $1^a$ of the bottom 1. The bottom 3 serves to screen or sift the material as it passes out of the receptacle and through the bottom thereof.

$1^b$ designates an annular rim extending from the bottom of the receptacle 1 and about one inch below the bottom of the sieve 3. About midway the length of the rim $1^b$ and along a diameter-line I secure a cross-wire 4, upon which is loosely and slidably mounted an agitator 5. The agitator 5 preferably consists of a stout coil-spring, to the ends $5^a$ of which the head-pieces $5^b$ are soldered or otherwise secured, and these head-pieces $5^b$ are apertured, as at $5^c$, to permit the passage of the cross-wire 4.

I am aware that sifters have heretofore been provided in which means are included above the screen-wire for agitating the material within the receptacle by direct contact therewith, and in devices of such character the chief objections to them lie in the fact that such agitators have a tendency to grind or rub the foreign matter in the material to be sifted through the wire sieve or bottom of the sifter. This objectionable feature is avoided in my invention, and so far as described the operation of my invention will be readily understood as follows: The operator fills the receptacle with flour or meal to about half its capacity and then shakes the same from left to right briskly. This will cause the vibrator 5 on the wire rod 4 to move from side to side, striking the wall of the rim of the sifter, thereby jarring the sifter and causing the flour or meal to pass through the screen-bottom thereof, the screen-bottom holding the foreign matter from passing therethrough and after the flour has passed through the sifter the foreign matter may be dumped out in the usual manner.

By constructing the vibrator of a coil-spring member as shown and described imparts to it a certain amount of elasticity which causes the vibrator to rebound rapidly when striking the wall of the rim of the sifter, thereby greatly adding to the jarring of the flour or meal through the sieve.

From the foregoing description, taken in connection with the accompanying drawings, it is thought the complete construction, operation and many advantages of the invention will be readily understood by those skilled in the art to which it appertains, and I desire it understood that slight changes in the detail, construction, operation, and arrangement of parts may be made without departing from the scope of the invention or the appended claim.

Having thus described my invention, what I claim, and desire to secure by Letters Patent, is—

A sifter comprising the combination with a receptacle, a screen forming the bottom therefor, said receptacle including a projecting rim at the bottom below the screen, a rod secured to said rim and passing diametrically across the receptacle, a resilient impacting member endwise movable on said rod for impacting said rim to shake or agitate the receptacle, said impacting member consisting of a coil-spring, apertured heads secured to the end of said coil-spring, said rod adapted to pass through the apertures of the heads, all being arranged substantially as shown and described.

ADRIENNA OTIE ATKINSON.

Witnesses:
H. C. ATKINSON,
OMA MEIERS.